United States Patent
Couchman

(10) Patent No.: US 10,104,822 B2
(45) Date of Patent: Oct. 23, 2018

(54) AUTONOMOUS FARM VEHICLE

(71) Applicant: KUHN-HUARD S.A., Chateaubriant (FR)

(72) Inventor: Johnny Couchman, Carlow (IE)

(73) Assignee: Kuhn-Huard S.A., Chateaubriant (FR)

( * ) Notice: Subject to any disclaimer, the term of this patent is extended or adjusted under 35 U.S.C. 154(b) by 282 days.

(21) Appl. No.: 15/129,612

(22) PCT Filed: Mar. 20, 2014

(86) PCT No.: PCT/EP2014/055663
§ 371 (c)(1),
(2) Date: Sep. 27, 2016

(87) PCT Pub. No.: WO2014/147208
PCT Pub. Date: Sep. 25, 2014

(65) Prior Publication Data
US 2017/0034983 A1    Feb. 9, 2017

(30) Foreign Application Priority Data
Mar. 20, 2013   (IE) .................................. S2013/0101

(51) Int. Cl.
*A01B 3/56* (2006.01)
*A01B 3/54* (2006.01)
(Continued)

(52) U.S. Cl.
CPC .................. *A01B 3/54* (2013.01); *A01B 3/56* (2013.01); *A01B 15/08* (2013.01); *A01B 15/14* (2013.01);
(Continued)

(58) Field of Classification Search
CPC .... A01B 3/16; A01B 3/18; A01B 3/20; A01B 3/22; A01B 3/28; A01B 3/32; A01B 3/34;
(Continued)

(56) References Cited

U.S. PATENT DOCUMENTS 1,367,127 A * 2/1921 Culbertson .............. A01B 3/68
                                                                                 172/213
1,427,677 A * 8/1922 Culbertson .............. A01B 3/16
                                                                                 172/213
(Continued)

FOREIGN PATENT DOCUMENTS

DE             905433 C       3/1954
DE          3221535 A1       12/1983
(Continued)

OTHER PUBLICATIONS

International Search Report PCT/EP2014/055663 International Filing Date: Mar. 20, 2014; 4 Pgs.

*Primary Examiner* — Robert E Pezzuto
*Assistant Examiner* — Adam J Behrens
(74) *Attorney, Agent, or Firm* — Oblon, McClelland, Maier & Neustadt, L.L.P.

(57) ABSTRACT

An autonomous farm vehicle is provided. In a preferred embodiment the vehicle is a plow, which is capable of driving itself without input from an operator. The plow is significantly lighter in weight and smaller in size then a combined tractor and plow, and can be operated continuously. The vehicle, includes a chassis mounted on a plurality of wheels and a tool in the form of a plowing assembly mounted to the chassis and displaceable about the chassis between a first and a second position, such that in the first position the plowing assembly is operational while the vehicle is driven in a first direction. In the second position the plowing assembly is operational while the vehicle is driven in a second direction substantially opposite to the first direction.

20 Claims, 8 Drawing Sheets

(51) Int. Cl.
*A01B 15/08* (2006.01)
*A01B 15/14* (2006.01)
*A01B 63/00* (2006.01)
*A01B 63/02* (2006.01)
*A01B 69/04* (2006.01)
*G05D 1/02* (2006.01)

(52) U.S. Cl.
CPC .......... *A01B 63/002* (2013.01); *A01B 63/023* (2013.01); *A01B 69/008* (2013.01); *G05D 1/0278* (2013.01); *G05D 2201/0201* (2013.01)

(58) Field of Classification Search
CPC .... A01B 3/40; A01B 3/44; A01B 3/50; A01B 3/52; A01B 3/54; A01B 3/56; A01B 3/60; A01B 3/62; A01B 3/68; A01B 5/08; A01B 15/08; A01B 15/14; A01B 15/145; A01B 63/002; A01B 63/023; A01B 69/008; G05D 1/0278; G05D 2201/0201
See application file for complete search history.

(56) References Cited

U.S. PATENT DOCUMENTS

| | | | |
|---|---|---|---|
| 3,601,200 A * | 8/1971 | Peterson | A01B 3/68 172/2 |
| 3,920,080 A * | 11/1975 | Vassiliou | A01B 15/145 172/447 |
| 3,980,141 A * | 9/1976 | Vest, Jr. | A01B 3/421 172/225 |
| 6,671,582 B1 * | 12/2003 | Hanley | A01B 51/02 250/339.11 |
| 6,804,587 B1 * | 10/2004 | O Connor | E02F 9/2045 342/357.31 |
| 9,144,188 B2 * | 9/2015 | Bover Trobat | A01B 3/50 |
| 2004/0256125 A1 * | 12/2004 | Lawrence, Jr. | A01B 5/14 172/518 |
| 2011/0047951 A1 * | 3/2011 | Moore | A01D 46/24 56/234 |
| 2012/0059554 A1 * | 3/2012 | Omelchenko | E02F 3/845 701/50 |
| 2012/0186213 A1 * | 7/2012 | Orlando | A01B 3/64 56/13.5 |
| 2013/0112441 A1 | 5/2013 | Bover Trobat | |
| 2016/0177517 A1 * | 6/2016 | Engels | G06T 7/20 404/75 |

FOREIGN PATENT DOCUMENTS

| | | | |
|---|---|---|---|
| EP | 1369007 A1 | 12/2003 | |
| EP | 2858471 A1 | 4/2015 | |
| GB | 191508554 A * | 6/1916 | .............. A01B 3/16 |
| WO | WO9531759 A1 | 11/1995 | |
| WO | WO2009141465 A1 | 11/2009 | |

* cited by examiner

AUTONOMOUS FARM VEHICLE

CROSS-REFERENCE TO RELATED APPLICATIONS

This application claims priority to PCT Application No. PCT/EP2014/055663, having a filing date of Mar. 20, 2014, based on IE S2013/0101, having a filing date of Mar. 20, 2013, the disclosure of both are herewith incorporated by reference in their entireties.

FIELD OF TECHNOLOGY

The following is concerned with an autonomous vehicle, and in particular an autonomous farm vehicle for plowing fields or the like in which the vehicle is self-propelled and operated fully automatically in order to allow the vehicle to work unattended on the land and for extended periods of time.

BACKGROUND

Plows and plowing are an integral and essential aspect of farming throughout the world, and have been for thousands of years. The plowing of land serves a number of important functions, in particular turning over the upper layer of soil in order to both aerate the soil, draw soil nutrients to the surface, and to bury weeds or remnants of the previous seasons crop, thereby replacing nutrients into the soil. Aerating the soil ensures that the soil can better retain moisture, thereby further improving the condition of the soil for the intended crop. Plowing also creates furrows into which seeds may then be located with uniform spacing, which is essential for the mechanization of farming.

This mechanization has however resulted in a number of problems, most notably of which is the proliferation of larger and larger tractors weighing multiple tons and which as a result damage the soil structure due to the weight of the vehicle compressing the soil, thereby undoing some of the benefits of the plowing action. These large machines are also relatively costly, and require an operator, meaning that in reality the tractors may be operational for only six to eight hours a day, the remaining time sitting idle.

In addition, in order to allow the combined tractor and trailing plow to be turned fully around at the end of each plowing run or furrow, it is necessary to provide a headland in the field to be plowed. The headland is a border at the perimeter of the field which provides space for this turning action, and which is not therefore initially plowed as the tractor and plow travel up and down the field, but which must then be plowed once the main area has been plowed by driving the tractor and plow around the perimeter of the field.

Document WO 2009/141465 A1 discloses a vehicle which can autonomously move between rows of crops in a greenhouse in order to perform different operations. The vehicle is provided with a chassis designed to receive different implements, as well as a coupling point to the rear for the coupling of machines and apparatuses. The vehicle includes an electronically controlled hydrostatic transmission system which enables the device to be moved in a continuous range of speeds so that it can be suitably adapted to requirements, as well as supplying power to the implements requiring same. The vehicle is moved by means of the dynamic balance of each of the caterpillar tracks forming a rolling system. For this purpose, a sensor system is provided consisting of pressure sensors, incremental encoders and a radar. The vehicle sensor system also includes ultrasound sensors distributed over the entire perimeter thereof, a magnetic compass and safety sensors. The information supplied by the sensor system enables vehicle localization and navigation in the working environment.

Document DE 32 21 535 A1 refers to a farm vehicle provided with a chassis comprising a main body and a tool carrier extending from the main body. A tool is attached to the tool carrier. The chassis is received on a plurality of wheels driven by an engine. The tool attached to the tool carrier is rotatable around the tool carrier. The tool carrier may be rotated by 180 degree around a vertical axis.

Document EP 1 369 007 A1 discloses a vehicle for autonomously performing a soil preparation. The device can be displaced autonomously, the device being provided with a wheel for driving and steering the device and with a harrow-unit for harrowing the soil. The device comprises only one wheel. A device for autonomously performing a soil preparation. The device can be displaced autonomously, the device being provided with a wheel for driving and steering the device and with a harrow-unit for harrowing the soil. The harrow-unit is provided with a packer roller that is subdivided into a number of packer-roller-units that are rotatable separately from each other.

Document WO 2012/010722 A1 refers to an implement comprising at least one first plow share in a front position, provided with anti-rollback means, and at least a second plow share in a rear position, with other anti-rollback means, said plow shares being interconnected by alternate approaching and distancing means; a telematics control unit based on a computer system and a global positioning system for the autonomous guiding and moving of the implement; a steering system that is formed by an oscillating support that can rotate in a plane perpendicular to the advancement of the implement, and lifts one of the plow share in relation to the ground and displaces it laterally; and a power supply system using renewable energy or internal or external combustion engines mounted on said implement.

Document 95/31759 A1 relates to an autonomous navigation system for an unmanned vehicle. The tracks or wheels are driven by hydraulic reversible motors, having the output thereof regulated by valves whose relative control can be used for controlling both heading and speed. The vehicle carries a navigation computer which receives positional information from an external positioning system. A ground station computer has been supplied with a digitized map over a predetermined path and the ground station computer is in a two-way radio communication with the vehicle navigation computer which is supplied with the information relating to the path. An established path, which is received from the external positioning system, is compared to the predetermined path and the vehicle navigation is modified for compensating the deviations.

Document DE 905 433 relates to a working vehicle. A chassis is received on a caterpillar system.

SUMMARY

An aspect relates to an autonomous farm vehicle comprising a chassis mounted on a plurality of wheels; a tool mounted to the chassis and displaceable about the chassis between a first and a second position, such that in the first position the tool is operational while the vehicle is driven in a first direction, and in the second position the tool is operational while the vehicle is driven in a second direction substantially opposite to the first direction.

Preferably, the tool, when operational, is oriented as a trailing link.

Preferably, the tool comprises a reversible plow.

Preferably, the reversible plow comprises a pair of moldboard plows mounted back to back and facing in the same operational direction.

Preferably, the moldboard of both plows turns to the same side.

Preferably, the dimensions of the chassis may be varied.

Preferably, the chassis comprises a main body and a cross member extending from the main body and to which the tool is mounted.

Preferably, the main body and cross member are arranged in a substantially T shaped configuration.

Preferably, the cross member is telescopically adjustable in length.

Preferably, the position at which the cross member extends from the main body may be varied.

Preferably, the tool is hingedly mounted to the chassis and is pivotable about the chassis between the first and second positions.

Preferably, the autonomous farm vehicle comprises an actuator operable to effect displacement of the tool between the first and second positions.

Preferably, the actuator comprises at least one hydraulic ram.

Preferably, the autonomous farm vehicle comprises at least three wheels, a pair of the wheels being provided on the main body and at least one of the wheels being provided on the cross member.

Preferably, each wheel is steerable.

Preferably, each wheel is driven.

Preferably, the autonomous farm vehicle comprises a drive source operable to drive at least one wheel of the vehicle.

Preferably, the drive source is mounted on and displaceable relative to the chassis.

Preferably, the autonomous farm vehicle comprises a sub frame mounted on the chassis, on which sub frame the drive source is mounted, the sub frame being displaceable relative to the chassis.

Preferably, the autonomous farm vehicle comprises a control unit adapted to operate the drive source and the steering mechanism.

Preferably, the control unit is operable to coordinate displacement of the drive source with displacement of the tool.

Preferably, the control unit comprises a GPS unit.

Preferably, the autonomous farm vehicle comprises one or more sensors operable to assist in positioning and controlling the vehicle.

BRIEF DESCRIPTION

Some of the embodiments will be described in detail, with reference to the following figures, wherein like designations denote like members, wherein.

DETAILED DESCRIPTION

Figure 1:
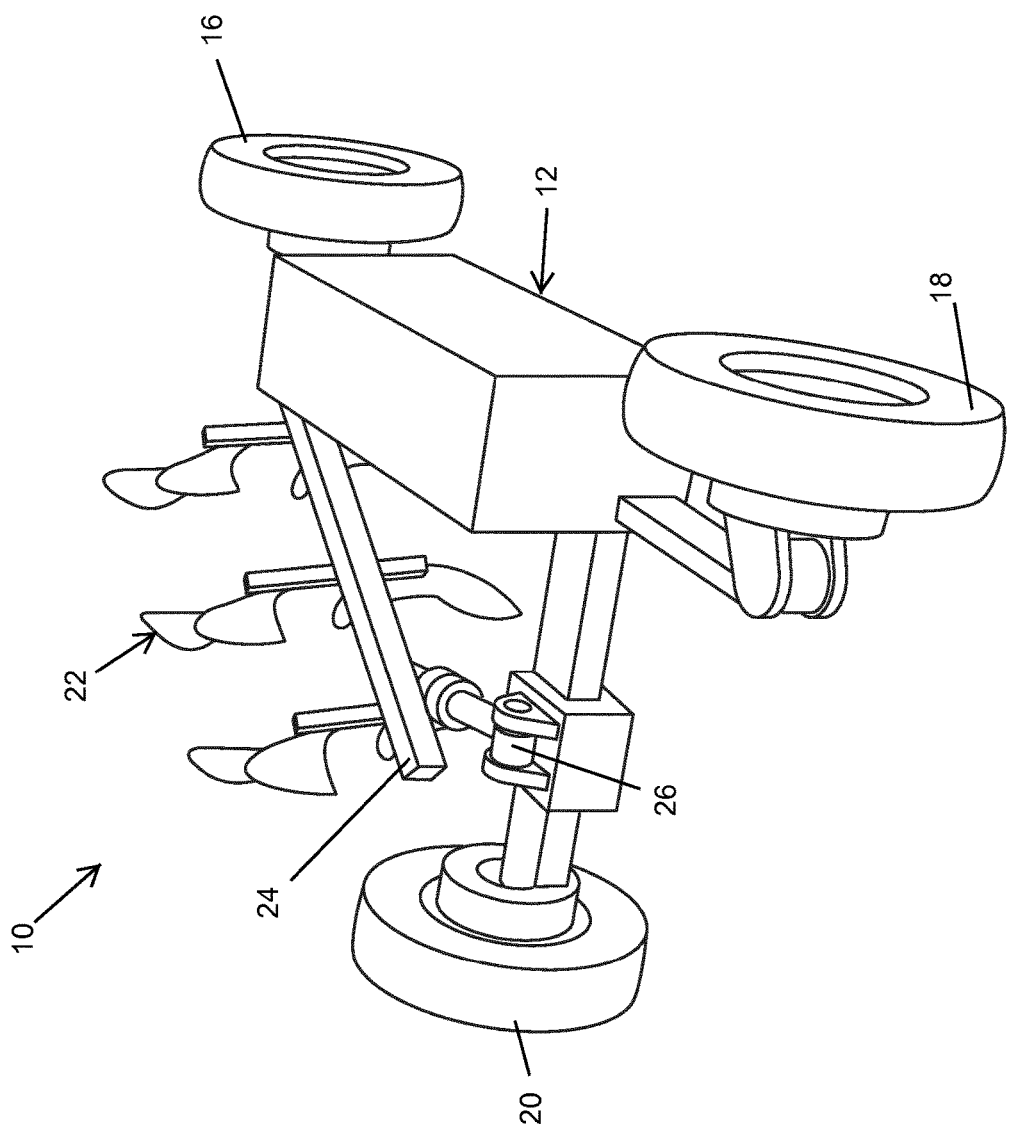
Figure 2:
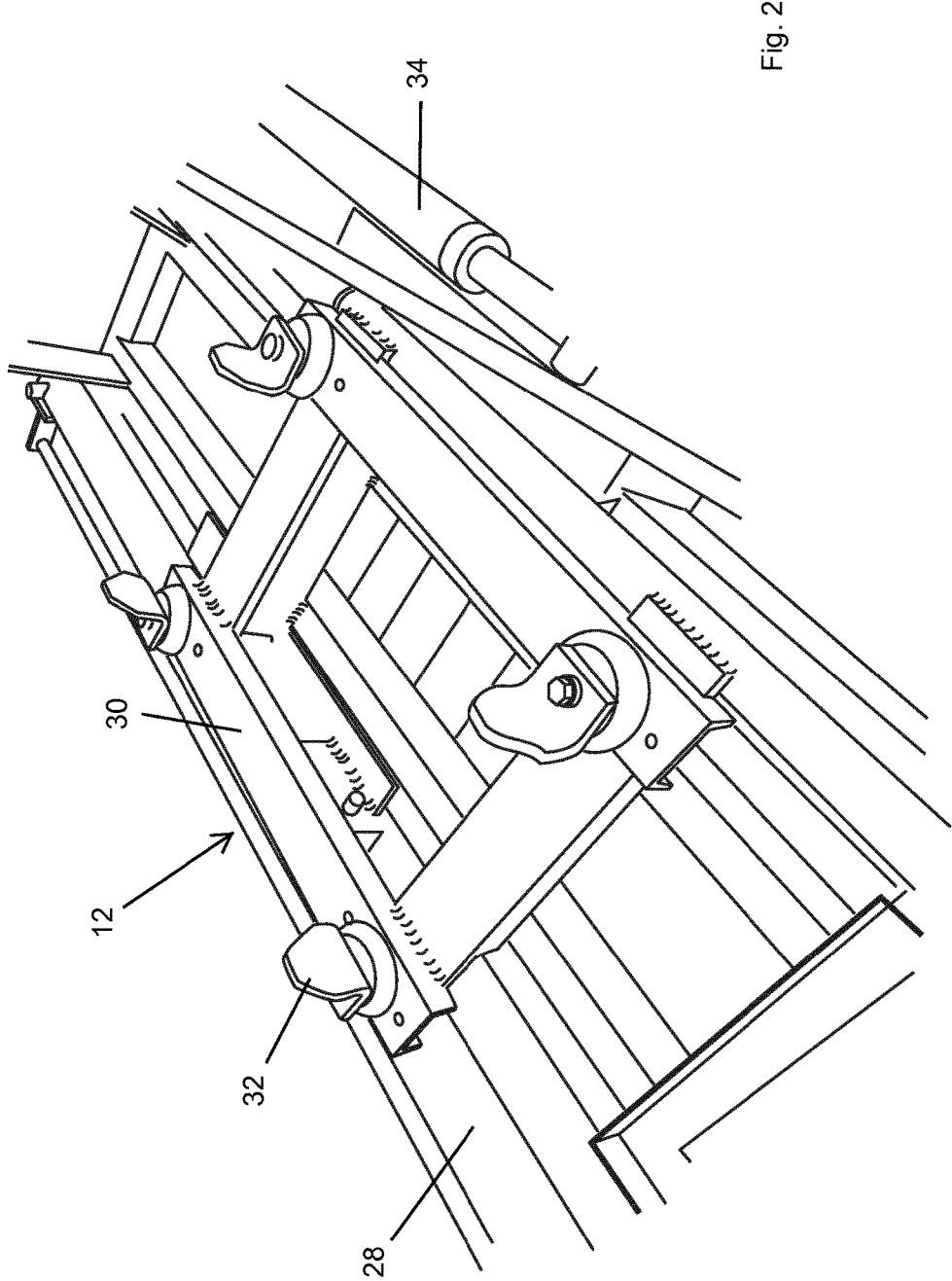
FIG. 2 illustrates an enlarged view of a portion of a chassis of the autonomous farm vehicle illustrated in FIG. 1, having an engine omitted for clarity.

Referring now to the accompanying drawings there is illustrated an autonomous farm vehicle, generally indicated as 10, which is adapted to be autonomously driven without input from an operator, to be significantly lighter in weight and smaller in size then a combined tractor and tool, for example plow, and can be operated continuously twenty four hours a day, to be stopped only for refueling and/or servicing requirements or the like, or when a job has been completed.

The vehicle 10 is also adapted, as will be described in detail hereinafter, such that it does not need to be turned around at the end of each plowing run before beginning the next parallel run in the opposite direction, thus saving considerable time and space, avoiding the requirement for a field to have a headland at either end. This additionally significantly reduces the number of steps which are required to be performed at the end of each plowing run, therefore reducing the time the vehicle spends at the end of each run, reducing both the overall plowing time and the compaction of the soil at each end of the plowed furrows.

The vehicle 10 comprises a chassis which comprises a main body 12 and a sub chassis or cross member 14 extending substantially perpendicularly from the main body 12, and in the embodiment illustrated at approximately the midpoint of the main body 12. The vehicle 10 further comprises a first wheel 16 mounted at one end of the main body 12 and a second wheel 18 mounted at the opposed end of the main body 12. Mounted outboard of the cross member 14 is a third wheel 20. It will however be appreciated from the following description of the configuration and operation of the vehicle 10 that additional wheels may be provided and the particular arrangement and positioning of the wheels may be varied as required. In the embodiment illustrated the wheels, in particular the first and second wheels 16, 18 are located outboard of the main body 12, and are connected thereto by means of a respective steering mechanism or linkage 21 which is autonomously controllable, as described hereinafter.

Figure 3:
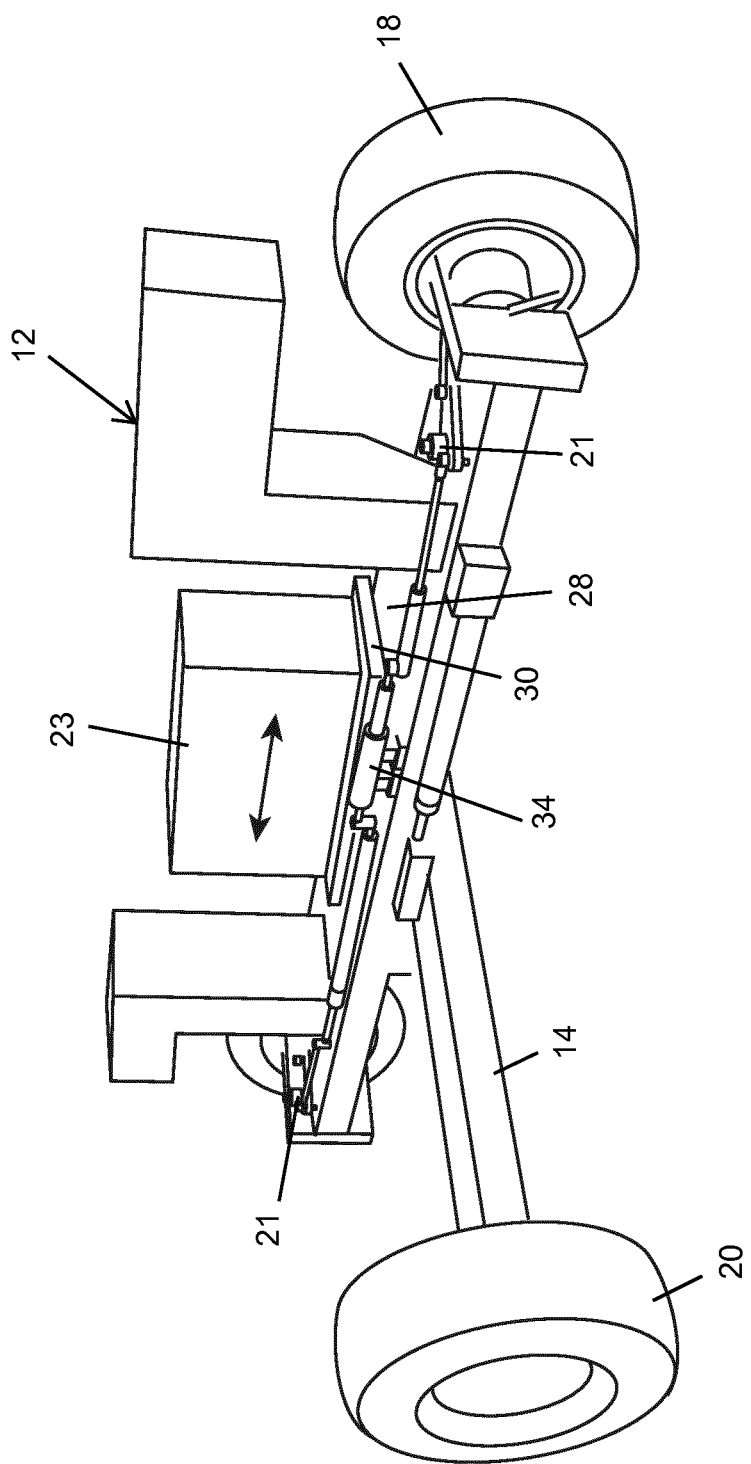
FIG. 3 illustrates an alternative perspective view of the autonomous farm vehicle in which a tool in the form of a plow has been omitted for clarity.

In the embodiment illustrated all three of the wheels 16, 18, 20 are both driven and steerable, although again it will be appreciated that one or more of the wheels may be omitted from been driven and/or steered. Any suitable power plant may be provided for driving the wheels 16, 18, 20 and/or steering the wheels, for example a conventional internal combustion engine shown schematically as 23, an electric motor, a combination of the two, a hydraulic power plant or any other suitable alternative. The engine 23 is visible in FIGS. 3 and 5, in which a portion of the chassis has been omitted to reveal the location of the engine 23. In the preferred embodiment illustrated the engine 23 is mounted on the main body 12 although it may of course be located at any other suitable location. The vehicle 10 is also provided with all of the necessary equipment, for example a control unit (not shown) to allow the autonomous control thereof. The control unit (not shown) may also be located in the main body 12 or at any other alternative location or spread across multiple locations. For example the control unit may comprise a GPS module (not shown) enabling the exact location of the vehicle 10 to be monitored, and an array of additional sensors, for example proximity sensors, infrared motion sensors, LIDAR, radar, acoustic and any other suitable sensors which, when combined with the GPS location of the vehicle may be used to assist in positioning and controlling the vehicle 10.

Figure 4:
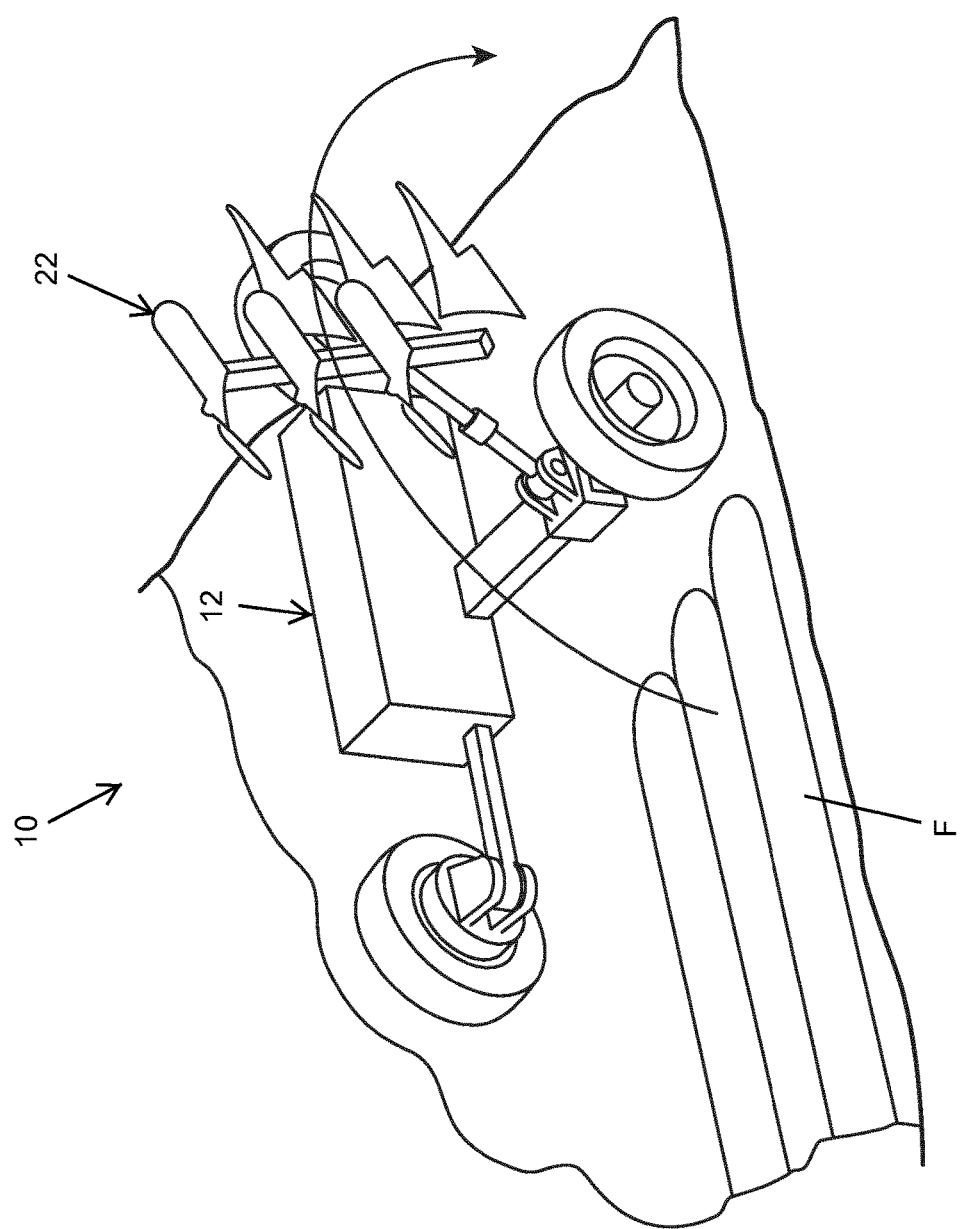
FIG. 4 illustrates a perspective view of the autonomous farm vehicle at the end of an initial plowing run where the plow is displaced from one position to another.

The vehicle 10 additionally comprises a tool 22, and in the embodiment illustrated a plow 22 supported on a frame 24 which is itself mounted to the cross member 14 by means of a hinge 26. The mounting arrangement allows the plow 22 to be hinged from a first position as illustrated in broken lines in FIG. 5, over the cross member 14 into a second position on the opposite side of the cross member 14 and shown in solid lines in FIG. 5, where the plow 22 can again contact the ground in order to plow a number of furrows. The vehicle 10 is capable of performing this displacement between the first and second positions automatically, and for example by means of one or more hydraulic cylinders (not shown) or the like acting on the frame 24 or hinge 26, or by any other suitable alternative. The action of displacing the plow 22 between the first and second positions is illustrated in FIG. 4.

A suitable control mechanism (not shown) may be provided in order to control the descent and/or ascent of the plow 22 about the cross member 14. For example a restrictor valve (not shown) may be incorporated into the hydraulic circuitry of the displacing hydraulic cylinders (not shown) in order to throttle the flow of oil and thus control the descent and/or ascent. The plow 22, in the embodiment illustrated, is a conventional reversible plow having two plows mounted back to back and facing in the same direction as one another. In addition, the two plows are arranged to turn the furrows to the same side, for example both to the right or both to the left. The plow 22 is positioned relative to the cross member 14 such as to trail the cross member 14 with respect to the direction of travel, effecting operating in a trailing link configuration.

Figure 5:
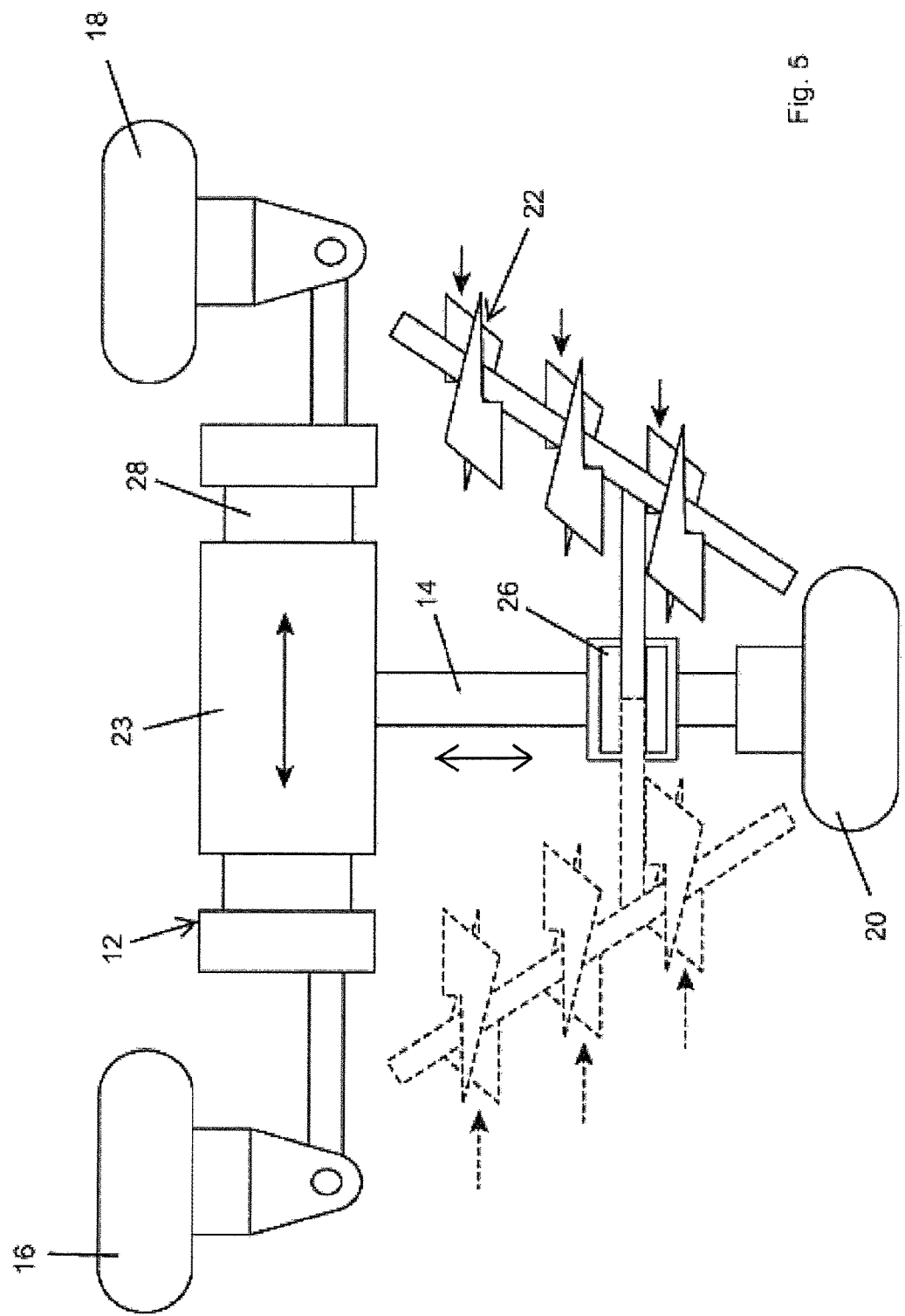
FIG. 5 illustrates a schematic plan view of the autonomous farm vehicle.

It will be appreciated that the stability of the autonomous vehicle 10, in particular when employing three wheels 16, 18, 20 will be affected by the displacement of the plow 22 from one side of the cross member 14 to the other. As a result the autonomous vehicle is adapted to compensate for the shift in position and weight of the plow 22. The main body 12 of the chassis thus comprises a bed 28 on which is mounted a sub frame 30 which is capable of being displaced along the main body 12 in both directions, as indicated by the double headed arrows shown in FIGS. 3 and 5, and thus towards or away from the plow 22. Thus referring for example to FIG. 5, it can be seen that the plow 22 is located to the right hand side, with the alternative position shown on the left hand side in broken lines. With the plow 22 on the right hand side, a greater proportion of the weight of the vehicle is to the right of the cross member 14, which may give rise to instability and/or a loss of drive and/or steering to one or more of the wheels, in particular the first wheel 16. In order to compensate for this the autonomous vehicle 10 is adapted to displace the entire engine 23, by means of the sub frame 30 to which the engine 23 is mounted on engine mounts 32, to the left as seen in FIG. 5, and preferably such that a greater proportion of the weight of the engine 23 is located on the far or left hand side of the cross member 14. This shift in the position of the engine 23 will therefore act to at least partially offset the effect of the weight of the plow 22 on the right hand side.

Similarly when the plow 22 is displaced over the cross member 14 to be located on the left hand side of the FIG. 5 image, the vehicle 10, and in particular the control unit (not shown) is adapted to automatically displace the engine 23 to the right hand side, and preferably such that a greater proportion of the weight of the engine 23 is located on the right hand side of the cross member 14, again to offset the weight of the plow 22. The engine 23, and in particular the sub frame 30, may be displaced by any suitable means, for example a double acting hydraulic ram 34. Any other suitable functional equivalent may of course be employed, for example a rack and pinion based arrangement or the like.

Figure 6A:
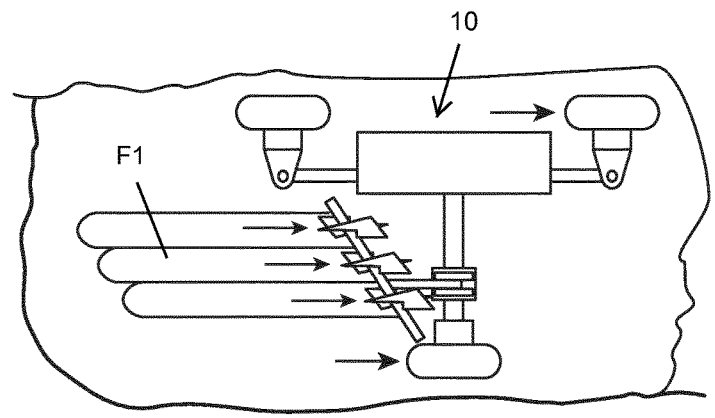
FIG. 6 illustrates a sequence of steps performed by the autonomous vehicle at the end of any given plowing run.
Figure 6B:
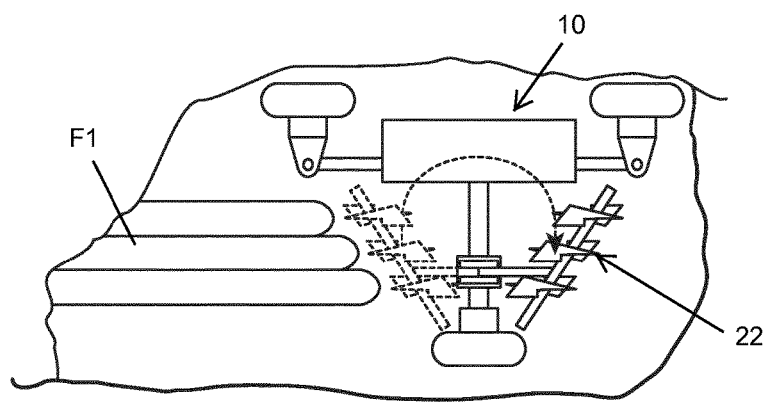
Figure 6C:
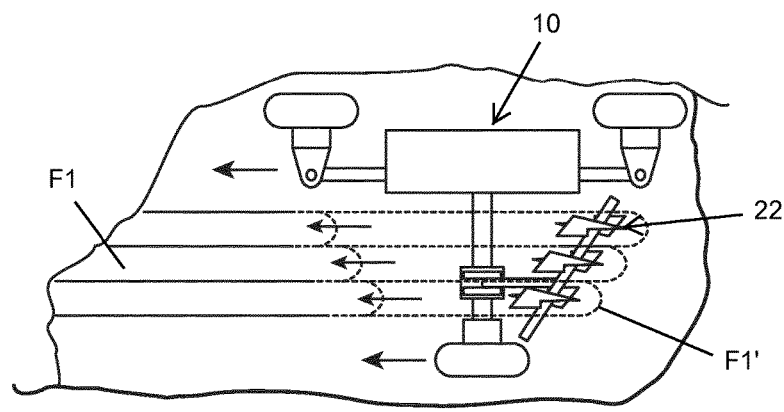
Figure 7A:
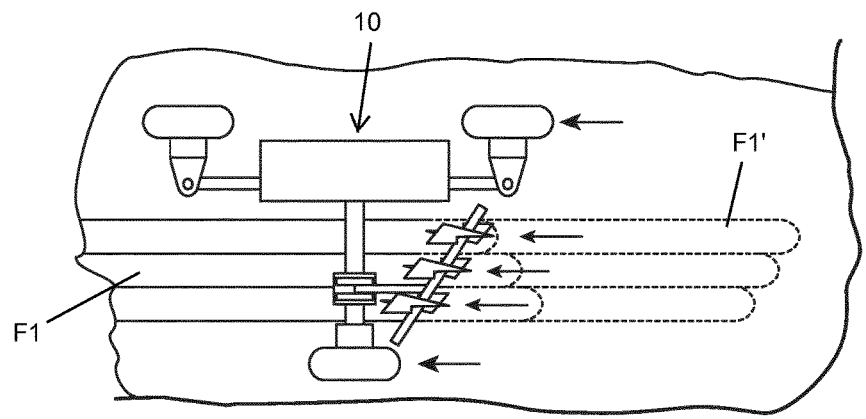
FIG. 7 illustrates a sequence of steps performed by the autonomous vehicle in moving from a first plowing run to a parallel second plowing run.
Figure 7B:
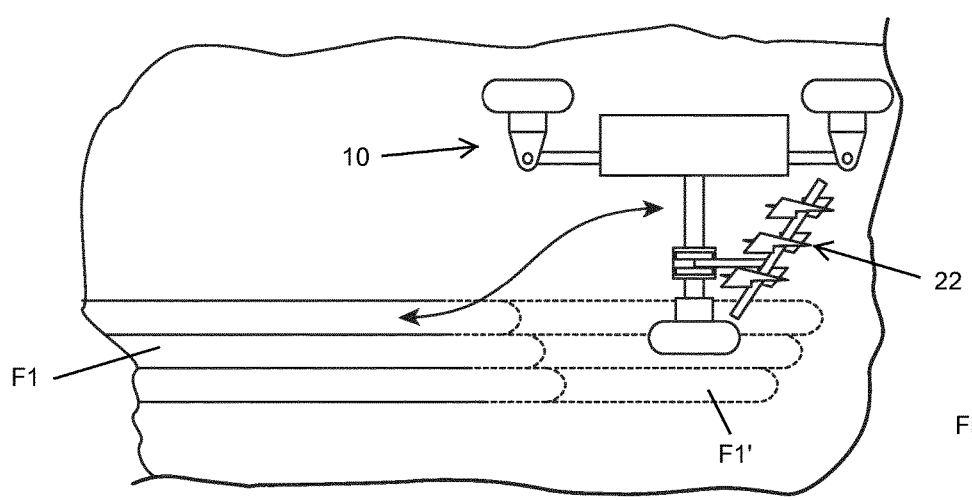
Figure 7C:
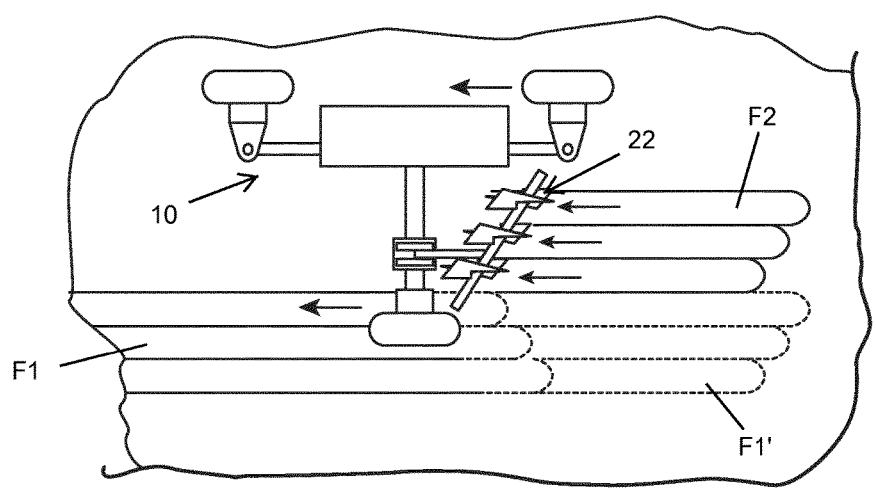
Figure 8:
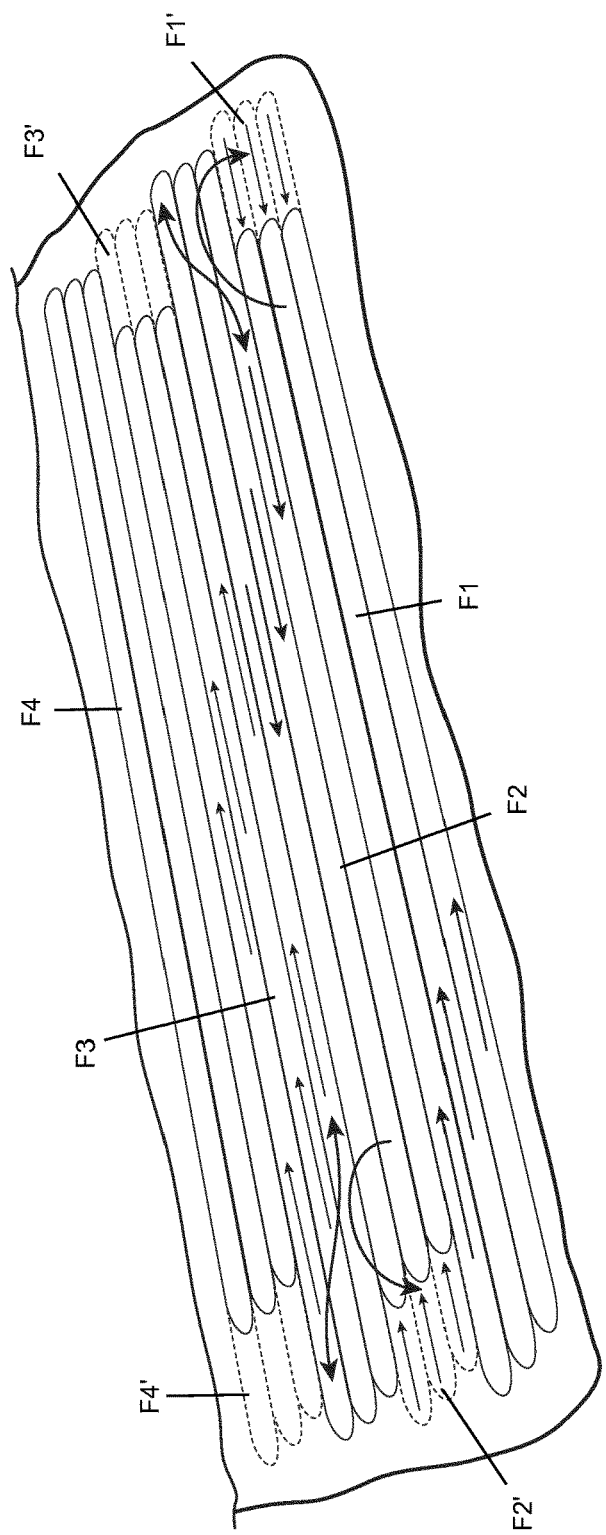
FIG. 8 illustrates a field filled with furrows as plowed by the autonomous farm vehicle, the sequence of steps being illustrated by the directional arrows.

Turning then to the operation, and referring now to FIGS. 6 to 8, in use the vehicle 10 is located in a field to be plowed, preferably beginning along one edge of the field. The exact GPS coordinates of the boundary of the field, or area to be plow, are pre-programmed into the vehicle and/or associated control systems (not shown), for example into a suitable memory module (not shown) accessible by or forming part of the control unit. The information could however be stored remotely of the vehicle, for example a remotely accessible network or the like. The vehicle 10 is then driven and steered autonomously based on the GPS coordinates and feedback from the various other onboard sensors (not shown).

The vehicle 10 preferably starts in one corner of the field with the plow 22 in the first position, trailing the cross member 14 with respect to the direction of travel, thus plowing a number of furrows down the length of the field as the vehicle 10 is driven. FIG. 6(*a*) illustrates the vehicle 10 at the beginning of a first plowing run, with the plow 22 in a first position on the left hand side of the cross member 14, and forming a first set of furrows F1 as the vehicle 10 travels from left to right. Referring to FIG. 6(*b*) when the vehicle 10 reaches the far side of the field, as established using GPS and optionally other complimentary sensors, the vehicle 10 is temporarily halted and the plow 22 raised upwardly and swung into the second position to the right of the cross member 14. In this position there remains a small section of ground between the end of the furrows F1 and the new position at which the plow 22 contacts the ground. At this point, and referring to FIG. 6(*c*), the vehicle 10 is driven in the reverse direction, in this case from right to left, the short distance necessary to form a first set of end furrows F1' which effectively complete the first furrows F1.

Turning then to FIG. 7(*a*), at this point the vehicle 10 is again temporarily halted, and the plow 22 raised slightly so as to be out of contact with the ground. Referring to FIG. 7(*b*) the vehicle 10 is then autonomously steered and driven into a position in which the plow 22 is positioned to create a new set of furrows parallel to the first set of furrows F1. This is achieved by moving the vehicle through a small S shaped path as illustrated by the double headed arrow shown in FIG. 7(*b*). It will therefore be understood that in order to move the autonomous vehicle 10 from a position completing the first set of furrows F1 into a position ready to plow the next parallel set of furrows requires very little maneuvering and thus time spent at the end of each plowing run.

At this point the autonomous vehicle 10 is ready to begin another plowing run, and is now driven from right to left across the field in order to generate a second parallel set of furrows F2 as illustrated in FIG. 7(*c*). On reaching the end of this plowing run the above sequence of steps is repeated in order to create end furrows FT to complete the furrows F2. This process is repeated over and over again until the entire field, or predefined area, is plowed. Such a completed area is illustrated in FIG. 8. It will therefore be understood that the vehicle 10 need never have to turn around when plowing a field, instead alternately displacing the plow 22 into the first and second positions at the end of each plowing run.

The autonomous vehicle 10 may be adapted, once a particular field or area has been fully plowed, to drive to a further location and being plowing a new field of the like. The onboard suite of sensors may be used, along with GPS, to assist in guiding the autonomous vehicle 10 between plowing sites while avoiding both static and active obstacles and the like.

The vehicle 10 may carry alternative tools, or smaller or larger plows depending on the requirements of the operation to be undertaken. To this end the third wheel 20 may be mounted to the cross member 14 such as to be telescopically or otherwise displaceable along a longitudinal axis defined by the cross member 14, thereby increasing or decreasing the distance between the first and second wheel 16, 18 and the third wheel 20, and thereby allowing tools of various dimension to be accommodated between the wheels 16, 18 and 20. The position of the frame 26 on the cross member 14 may also be varied laterally by any suitable means (not shown), thus allowing the position of the plow 22 relative to the third wheel 20 to be varied, such that the width of the first furrow can be adjusted. Achieving even plowing of all furrows is important to the evenness of the plowed field. In addition, as an alternative or complimentary mechanism to vary the center of gravity of the device 10, for example to ensure that the device 10 remains stable while the tool 22 is being displaced between the first and second positions, the cross member 14 may be displaceable longitudinally along the main chassis 12 by any suitable means.

The vehicle 10 of the present invention therefore enables plowing to be achieved in a much simple, faster, and less damaging manner. The overall length of the vehicle 10 is significantly shorter than a conventional tractor with a plow at each end, and for example may be half the length of such a setup. Due to the design and operation of the vehicle 10 no headlands are required to be provided, such that the plowed area is completed at the last run. The vehicle 10 is also considerably lighter than a conventional tractor/plow combination, and in many cases may weigh as little as ⅓ the weight. In addition the vehicle 10 will cost significantly less than a tractor/plow combination, and can be operated essentially continuously and without an operator.

The invention claimed is:

1. An autonomous farm vehicle comprising:
    a chassis including a main body and a cross member extending from the main body, the chassis being mounted on a plurality of wheels that includes at least three wheels, and
    a tool mounted to the cross member, wherein
    the tool is mounted to the cross member to be displaceable over the cross member between a first and a second position such that, as viewed from directly above the cross member, the tool crosses the cross member during displacement between the first position and the second position, whereby in the first position the tool is operational while the vehicle is driven in a first direction, and in the second position the tool is operational while the vehicle is driven in a second direction substantially opposite to the first direction, and
    a pair of the at least three wheels is provided on the main body and at least one of the at least three wheels is provided on the cross member.

2. The autonomous farm vehicle according to claim 1 in which the tool, when operational, is oriented as a trailing link.

3. The autonomous farm vehicle according to claim 1 in which the tool comprises a reversible plow.

4. The autonomous farm vehicle according to claim 3 in which the reversible plow comprises a pair of moldboard plows mounted back to back and facing in the same operational direction.

5. The autonomous farm vehicle according to claim 4 in which the moldboard of both plows turns to the same side.

6. The autonomous farm vehicle according to claim 1 in which the chassis is configured such that a dimension of the chassis is variable.

7. The autonomous farm vehicle according to claim 1 in which the main body and cross member are arranged in a substantially T shaped configuration.

8. The autonomous farm vehicle according to claim 1 in which the cross member is telescopically adjustable in length.

9. The autonomous farm vehicle according to claim 1 in which the cross member is configured such that a position along the length of the main body at which the cross member extends from the main body is variable.

10. The autonomous farm vehicle according to claim 1 in which the tool is hingedly mounted to the chassis and is pivotable over the cross member between the first and second positions.

11. The autonomous farm vehicle according to claim 1 comprising a drive source operable to drive at least one of the at least three wheels of the vehicle, wherein the drive source is mounted on and displaceable relative to the chassis.

12. The autonomous farm vehicle according to claim 11 comprising a sub frame mounted on the chassis, on which sub frame the drive source is mounted, the sub frame being displaceable relative to the chassis.

13. The autonomous farm vehicle according to claim 11 comprising a control unit adapted to operate the drive source and a steering mechanism.

14. The autonomous farm vehicle according to claim 13 in which the control unit is operable to coordinate displacement of the drive source with displacement of the tool.

15. An autonomous farm vehicle comprising:
    a chassis including a main body and a cross member extending from the main body, the chassis being mounted on a plurality of wheels, and
    a tool mounted to the cross member, wherein
    the tool is mounted to the cross member to be displaceable over the cross member between a first and a second position such that, as viewed from directly above the cross member, the tool crosses the cross member during displacement between the first position and the second position, whereby in the first position the tool is operational while the vehicle is driven in a first direction, and in the second position the tool is operational while the vehicle is driven in a second direction substantially opposite to the first direction, and
    the chassis is configured such that a dimension of the chassis is variable.

16. The autonomous farm vehicle according to claim 15 in which the cross member is telescopically adjustable in length.

17. The autonomous farm vehicle according to claim 15 in which the cross member is configured such that a position along the length of the main body at which the cross member extends from the main body is variable.

18. The autonomous farm vehicle according to claim 15 comprising a drive source operable to drive at least one of at least three wheels of the plurality of wheels of the vehicle, wherein the drive source is mounted on and displaceable relative to the chassis.

19. An autonomous farm vehicle comprising:
a chassis including a main body and a cross member extending from the main body, the chassis being mounted on a plurality of wheels, and
a tool mounted to the cross member, wherein
the tool is mounted to the cross member to be displaceable over the cross member between a first and a second position such that, as viewed from directly above the cross member, the tool crosses the cross member during displacement between the first position and the second position, whereby in the first position the tool is operational while the vehicle is driven in a first direction, and in the second position the tool is operational while the vehicle is driven in a second direction substantially opposite to the first direction, and
the cross member is telescopically adjustable in length.

20. The autonomous farm vehicle according to claim 19 in which the cross member is configured such that a position along the length of the main body at which the cross member extends from the main body is variable.

* * * * *